United States Patent [19]

Stalter, Sr.

[11] Patent Number: 4,790,605

[45] Date of Patent: Dec. 13, 1988

[54] VEHICLE WHEEL WITH ORNAMENTAL PLASTIC OVERLAY

[75] Inventor: Robert J. Stalter, Sr., Bowling Green, Ohio

[73] Assignee: Motor Wheel Corporation, Lansing, Mich.

[21] Appl. No.: 19,709

[22] Filed: Feb. 27, 1987

[51] Int. Cl.[4] ............................................. B60B 7/00
[52] U.S. Cl. ............................ 301/37 CM; 301/37 P; 301/108 A
[58] Field of Search ............. 301/37 P, 37 CM, 37 R, 301/37 PB, 37 TP, 108 R, 108 A

[56] References Cited

U.S. PATENT DOCUMENTS

| | | | |
|---|---|---|---|
| 2,973,226 | 2/1961 | Ellies | 301/37 P |
| 3,823,982 | 7/1974 | Spisak | 301/37 P |
| 3,891,276 | 6/1975 | Spisak | 301/37 R |
| 3,894,775 | 7/1975 | Christoph et al. | 301/37 TP |
| 3,918,762 | 11/1975 | Hampshire | 301/37 P |
| 4,210,367 | 7/1980 | Spisak | 301/37 R |

FOREIGN PATENT DOCUMENTS

| | | | |
|---|---|---|---|
| 192772 | 12/1956 | Austria | 301/37 CM |
| 1210695 | 3/1960 | France | 301/108 A |

*Primary Examiner*—Robert B. Reeves
*Assistant Examiner*—Russell D. Stormer
*Attorney, Agent, or Firm*—Barnes, Kisselle, Raisch, Choate, Whittemore & Hulbert

[57] ABSTRACT

A composite styled wheel having a metal wheel mounting disc and rim secured together and adapted to receive a tire thereon, and a plastic ornamental overlay body permanently affixed and covering at least a part of the outboard face of the disc and/or rim. The body is made of an elastomeric material, and its outboard face has a decorative contour exposed to view from the outboard side of the wheel. Hub cap retainer grooves or pockets are provided in the outboard face of the body adapted to individually yieldably engage and retain attachment prongs of a hub cap for removable attachment of the same to the wheel. Each of the grooves or pockets has an opening at an outboard face of the body with juxtaposed entrance edges spaced apart a distance less than a maximum transverse dimension of the associated prong to provide an interference fit therewith. Each groove or pocket also has an interior wall surface defining an undercut relationship relative to the opening edges. The entrance edges and the contiguous interior wall surface are yieldable so as to spread apart to permit insertion of the associated prong and then to return to a spring keeper relationship once the associated prong reaches a seated position in the groove or pocket matching the fully seated position of the hub cap on the body.

8 Claims, 3 Drawing Sheets

U.S. Patent  Dec. 13, 1988  Sheet 1 of 3  4,790,605
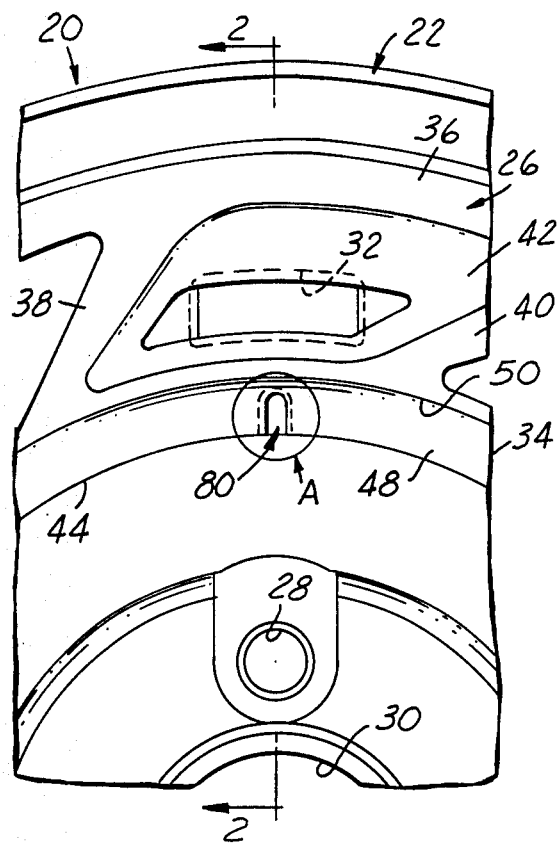
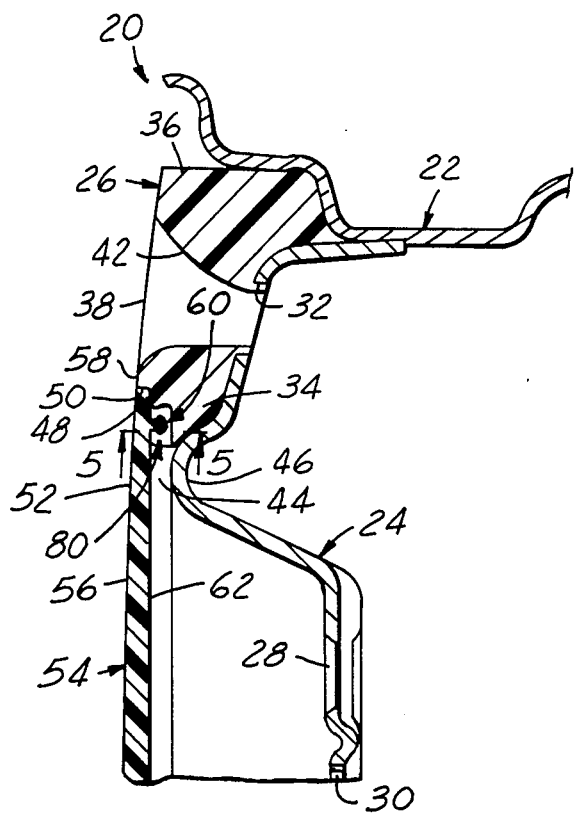
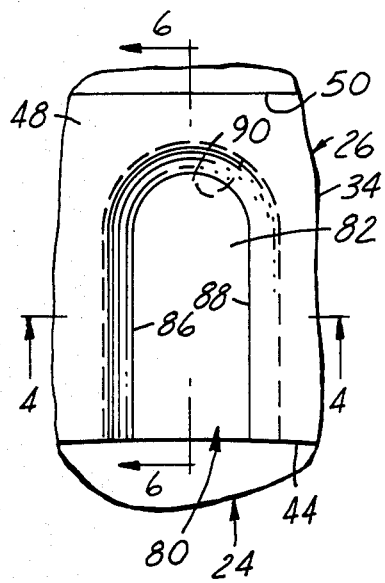
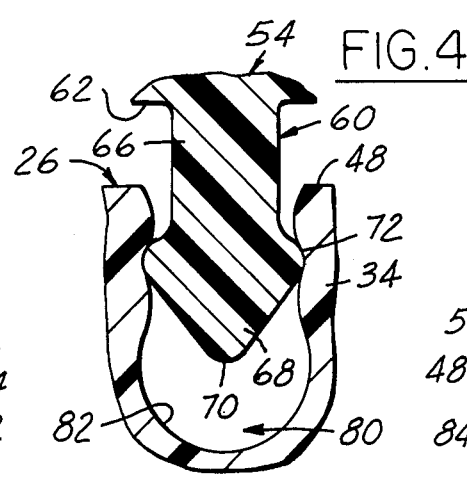
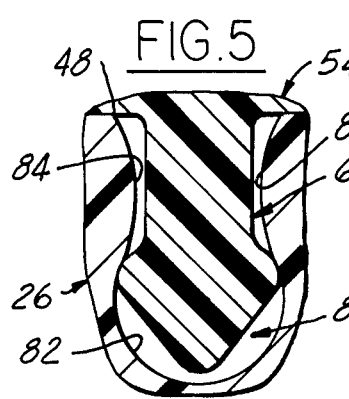
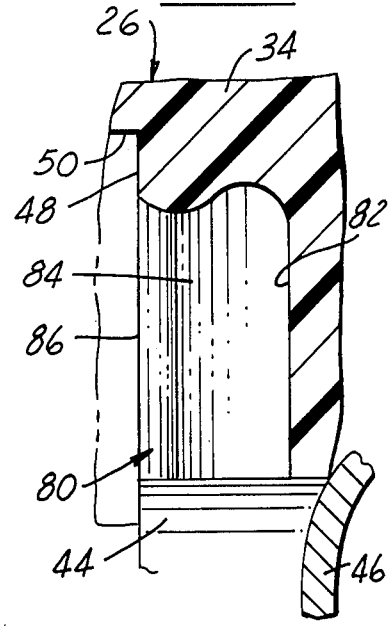

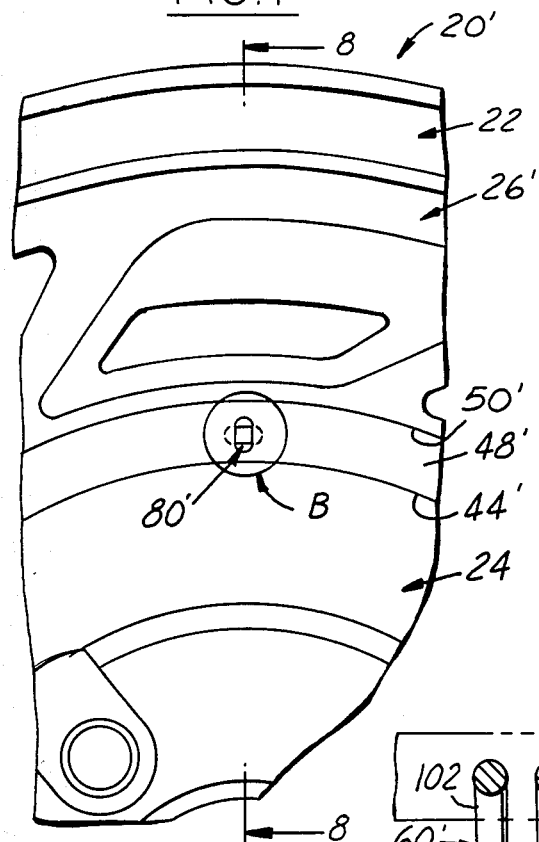
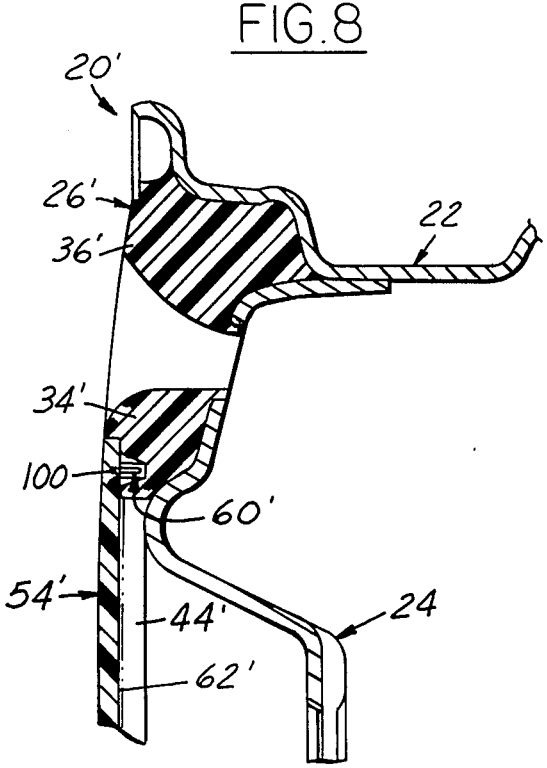
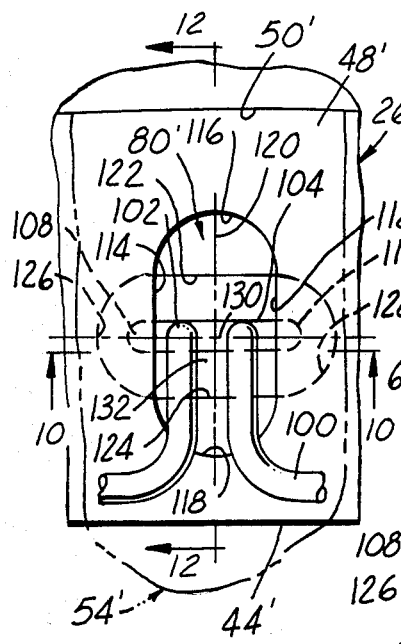
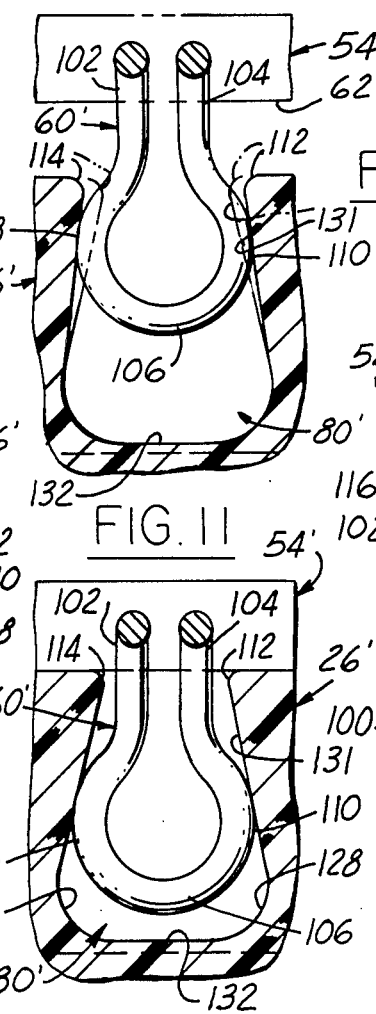
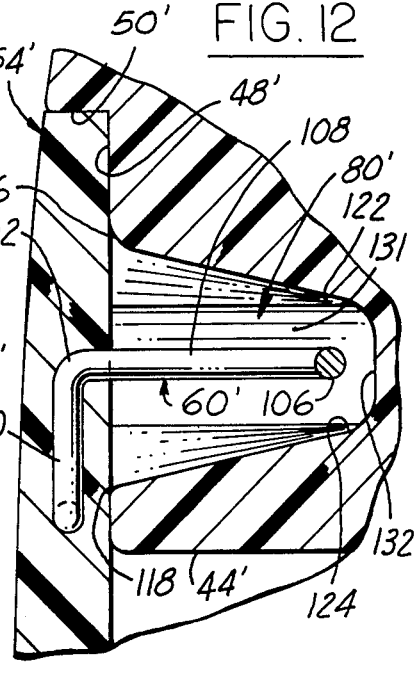

VEHICLE WHEEL WITH ORNAMENTAL PLASTIC OVERLAY

This invention relates to styled wheels for vehicles, and more particularly to a composite metal-elastomer automotive-type styled vehicle wheel construction with a three-dimensional deeply contoured ornamental outboard face, and to hub cap retention structure for such a wheel.

In the early 1970's Motor Wheel Corporation of Lansing, Mich., assignee of applicant herein, as well as its then parent Company, The Goodyear Tire & Rubber Company of Akron, Ohio, developed and introduced an improved form of composite metal-elastomer styled wheel marketed under the registered trademark "POLYCAST". Such styled wheels provided an automobile type wheel in which metallic parts of simple, conventional configuration, for which manufacturing equipment was already available, are utilized as the basic structural components to thereby obtain a high strength standardized wheel construction at minimum cost. The aesthetically pleasing appearance was imparted to this standard stell backbone by a permanently adhered ornamental plastic body, either molded separately or in situ as a homogeneous one-piece body or in the form of a plastic covewr secured by an adhesive foam body to the outboard side of the wheel. This provided an improved anti-noise characteristic to the wheel and enabled the appearance of the wheel to be readily and economically varied to suit different customer's styling requirements without varying the basic structural components of the wheel. Additional benefits resided in the side impact cushioning to prevent damage to the wheel while retaining the high strength and impact resistance advantages of the time-proven conventional ductile steel wheel components. Wider variations in styling and contour configurations were also obtained than were possible inthe previous deep drawn styled all-steel wheels.

Various embodiments of such "POLYCAST" wheels, as well as methods and apparatus for producing the same, are set forth in the following United States Patents assigned either to the assignee herein or its parent, The Goodyear Tire & Rubber Company, which are incorporated herein by reference:

| No. 3,669,501 | 6/1972 | Derleth |
| No. 3,756,658 | 9/1973 | Adams |
| No. 3,762,677 | 10/1973 | Adams |
| No. 3,815,200 | 6/1974 | Adams |
| No. 3,918,762 | 11/1975 | Hampshire |
| No. 3,794,5299 | 2/1974 | Thompson |
| No. 3,935,291 | 1/1976 | Jackson |
| No. 3,956,451 | 5/1976 | Adams |
| No. 4,398,770 | 8/1983 | Smith |

Other prior art patents issued to unrelated parties and directed to various facets of such styled composite metal and plastic wheels include U.S. Pat. Nos. 3,823,982 and 3,998,494, as well as British Patent 1,290,946 (1972).

In one form of commercial manufacture of such "POLYCAST" wheels, a portion of the mold comprises a conventional metal vehicle wheel having a drop center rim secured to a central disc or body having the usual bolt circle holes and a central aperture so that the disc can be mounted on an axle, drum or disc brake assembly. The metal wheel is employed in conjunction with an upper back-up clamp and lower mold part to define therewith a sealed cavity for molding and attaching a three-dimensional contoured plastic overlay, the overlay thus being molded in situ and permanently attached to the outboard side of the wheel in the mold apparatus. Preferably, the wheel forms the upper surface of the mold cavity and a reaction mixture of a urethane elastomer liquid adhesive material is injected or poured into the mold to fill the cavity and contact the outboard surface of the wheel assembly. The urethane material solidifies to form a high density non-cellular elastomer body which permanently adheres to the outboard surface of the wheel subassembly. The plastic overlay may also be constructed from a lower density microcellular closed cell urethane elastomer adhesive material. The urethane material is allowed to solidify in the mold cavity and then the mold is opened so that the wheel with the overlay securely adhered to it may be removed from the mold. The overlay may then be painted or otherwise covered with a decorative coating to provide a finished metallic-appearing ornamental wheel. The urethane elastomer thus forms a plastic body having a three-dimensional contour which is permanently attached to the outboard side of the wheel to provide a decorative surface, and the elastomer overlay appears to be an integral portion of the metal wheel.

In almost all of such "POLYCAS" wheel designs the wheel disc and plastic overlay are provided with a center through-opening coaxial with the wheel hub and wheel spindle to provide a suitable space for receiving the vehicle wheel spindle therein. Customarily, a separate hub cap or center ornament is detachably mounted in the center opening of the outboard face of the wheel overlay to close the wheel spindle cavity. Such hub caps are usually made of chrome-plated or bright metal or suitable plastic and are fashioned with a decorative styling complemental to the wheel, and usually bear the vehicle manufacturer's trademark.

Generally, in the past, two systems of hub cap retention have been employed with such "POLYCAST" wheels. One type of system is that disclosed, for example, in the above-listed Derleth U.S. Pat. No. 3,669,501 and the Smith U.S. Pat. No. 4,398,770 wherein a so-called metallic "dixie cup" is attached directly to the metal disc of the wheel and protrudes axially in an outboard direction therefrom to define the wheel spindle cavity. The "dixie cup" then removably receives at its hollow outboard end a suitable decorative hub cap. While this system is quite workable and has been used successfully in millions of "POLYCAST" wheels, the same is somewhat expensive, both from the standpoint of manufacture of the "dixie cup" itself as well as assembly to the disc,.

The other type of ornamental retention is employed in such "POLYCAST" wheels is where the hub cap, whether of plastic or metal construction, is secured only to the urethane material of the plastic overlay and thus only indirectly to the metal components of the wheel. Some examples of this type of hub cap retention are illustrated in the aforementioned Hampshire U.S. Pat. No. 3,918,762, as well as in the Spisak U.S. Pat. Nos. 3,823,982 and 3,998,494. These indirect attachment systems are advantageous in that they eliminate the aforementioned "dixie cup" insert, and, hence the cost and weight of the same. However, such ornament retention is dependent in part on the urethane foam properties, and for security and reliability generally requires a relatively expensive urethane material of relatively high density to provide sufficient strength for secure attachment under adverse conditions. In addition, uniformity in retention strength from wheel to wheel is difficult to maintain and particularly a problem if it is desired to vary the urethane foam properties, such as hardness, density, etc. Moreover, the current practice of designing retention nubbins or recesses into the urethane foam around the inner periphery of the wheel spindle cavity is severely limited because of problems of die lock in the manufacturing process as well as the limited strength properties of the urethane foam material. The center cavity indirect attachment system also sets limitations on the choice of urethane foam materials to be employed in the plastic overlay due to the need to be concerned with the temperature sensitivity of the urethane foam as well as its compression set and creep properties.

Despite the aforementioned disadvantages of indirect attachment systems, there is still a need for the same if the aforementioned problems are to be overcome. One important recent improvement in indirect attachment systems is set forth in my copending application Ser. No. 788,156, filed Oct. 16, 1985, and assigned to the assignee of record herein, now U.S. Pat. No. 4,682,820, issued July 28, 1987. This invention overcomes the aforementioned problems of prior indirect attachment systems by utilizing special forms of retainer wires cast-in-situ in the decorative urethane overlay to provide snap-in retention of a hub cap in the center opening of the overlay. Nevertheless, there still remains the cost of the retainer wire itself as well as labor cost in assembling the same in the mold. Moreover, this solution is not well adapted for use in "POLYCAST" wheel constructions having a "shallow" section, i.e., a smaller than usual axial dimension in the urethane overlay material adjacent the center opening, and/or in those designs wherein the urethane overlay is spaced a relatively large distance radially away from the wheel axis.

On the face of it, one might look for seemingly simpler and less expensive solutions in the prior art attachment systems developed for plastic and metal wheel covers and hub caps which are customarily provided with axially extending fingers, pins, or the like for resiliently passing through and engaging the edges of holes, nubbins and the like in or on the steel wheel disc. Examples of such prior art are U.S. Pat. Nos. 2,973,276; 3,101,975 and 4,012,078 as well as the German Patent No. 2,952,000. However, such "pin-on" attachments have not proven suitable for use with composite metal-elastomer wheel construction of the aforementioned "POLYCAST" styled wheel type.

The only known prior art attempt to achieve a push-on finger type attachment is that set forth in U.S. Spisak Pat. No. 3,891,276 which discloses a metallic wheel trim ring provided with a plurality of axially extending fingers which are inserted into one or more circumferential grooves formed in the radial extending outboard face of the plastic overlay portion adjacent the outboard wheel rim tire bead retaining flange. In the Spisak attachment system, the plastic is provided with a groove of substantially constant width, throughout its depth, and the trim ring attachment fingers are made of resilient sheet metal material with reverse angled barbs 41 struck out therefrom. Upon insertion of the fingers into the groove of the plastic the same operate to bite into the urethane for permanently holding the trim ring thereon. Thus, the Spisak '276 patent system is not adaptable for use with removable hub caps because retrograde movement of the pin barbs would dig into the urethane and damage the same upon removal of the trim ring, which in turn would destroy the holding power of the spring fingers in the urethane plastic groove. Moreover the attachment finger construction is relatively complex, as is the associated structure of the trim ring, thus adding to the cost of the aforementioned Spisak attachment system.

Accordingly, objects of the present invention are to provide an improved composite metal-elastomer construction of the aforementioned "POLYCAST" styled wheel type which (1) overcomes the aforesaid problems of mounting the removable ornamental hub cap to the outboard face of the wheel; (2) provides more secure and reliable ornament retention properties; (3) permits a broader range of selection of urethane materials which are lower in cost and weight without endangering center ornament retention; (4) provides a retention system which is independent of the steel backbone or disc of the wheel construction; (5) is less expensive than other prior means of retention such as the use of the aforementioned "dixie cup" attached to the steel backbone or disc; (6) provides an improvement in the retention force over the aforementioned direct attachment systems which is also unaffected by the normal variations resulting from shrinkage of the urethane material; (7) minimizes the concern over the temperature sensitivity of the urethane foam material and its compression set and creep properties; and (8) which permits the use of non-resilient attachment prongs or fingers on the hub cap, and hence provides a broad range of selection of hub cap materials and simplification of hub cap design and reduction in cost thereof.

Another object of the present invention is to provide an improved method of making a composite wheel of the above character in an economical and reliable manner.

Other objects, as well as features and advantages of the present invention will become apparent from the following detailed description and appended claims taken in conjunction with the accompanying drawings (which are to scale), wherein:

FIG. 1 is a fragmentary elevational view of an exemplary embodiment of a vehicle wheel constructed in accordance with the present invention as viewed from the outboard face thereof, and shown without a hub cap of the invention attached thereto to better illustrate the underlying attachment groove pocket in the ornamental plastic overlay of the wheel construction.

FIG. 2 is a cross-sectional view taken on the line 2—2 of FIG. 1, but with a first embodiment of a hub cap construction shown attached to the outboard face of the overlay.

FIG. 3 is a fragmentary side elevational view of the portion of FIG. 1 shown in the circle labeled "A" in FIG. 1, but greatly enlarged thereover to better illustrate detail.

FIG. 4 is a fragmentary cross-sectional view taken on the line 4—4 of FIG. 3, illustrating an attachment prong of the hub cap partially inserted into the retention groove pocket in the urethane body.

FIG. 5 is a view similar to FIG. 4 but illustrating the attachment prong of the hub cap fully seated in the attachment groove pocket of the urethane body, and is a cross-sectional view taken on line 5—5 of FIG. 2.

FIG. 6 is a fragmentary cross-sectional view taken on the line 6—6 of FIG. 3.

FIG. 7 is a fragmentary elevational view of the outboard face of a modified wheel construction also in accordance with the present invention, and illustrating the wheel without the hub cap attached thereto to better illustrate the underlying securement pocket in the urethane plastic body employed in this embodiment.

FIG. 8 is a fragmentary cross-sectional view taken on the line 8—8 of FIG. 7, but with the modified hub cap construction of this embodiment shown attached to the outboard face of the overlay.

FIG. 9 is a fragmentary elevational view of a portion of the wheel construction shown in the circle labeled "B" in FIG. 7, but greatly enlarged thereover, and also illustrating the modified attachment prong of this embodiment seated in the attachment pocket of this embodiment.

FIG. 10 is a fragmentary cross-sectional view taken on the line 10—10 of FIG. 9 illustrating the attachment prong partially inserted in the pocket.

FIG. 11 is a view similar to FIG. 10 illustrating the attachment prong fully inserted and seated in the pocket; and FIG. 12 is a cross-sectional view taken on the line 12—12 of FIG. 9.

Figure 13:
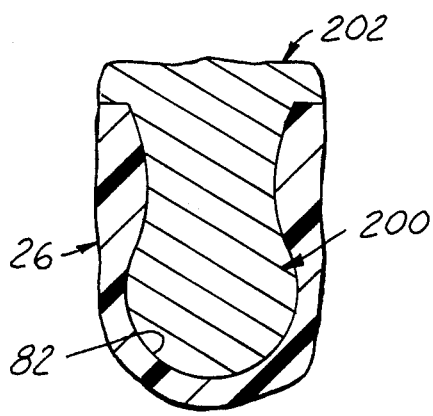
FIGS. 13 and 14 are fragmentary cross-sectional views, similar to those of FIGS. 5 and 6 respectively, showing a first embodiment of a core protrusion of the hold engulfed in the urethane material of the ornamental plastic overlay as utilized in making the attachment groove pocket of the embodiment of FIGS. 1-6.
Figure 14:
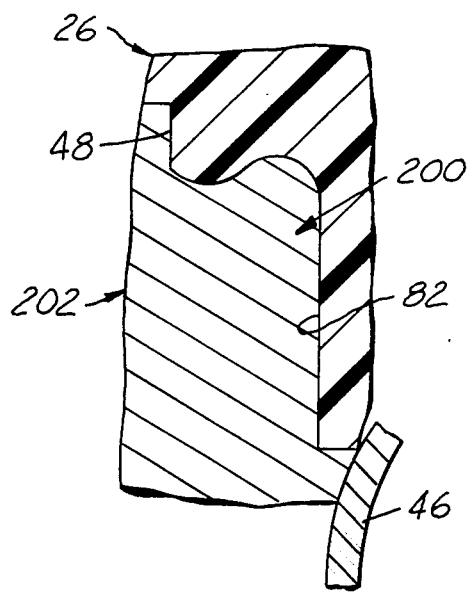
Figure 15:
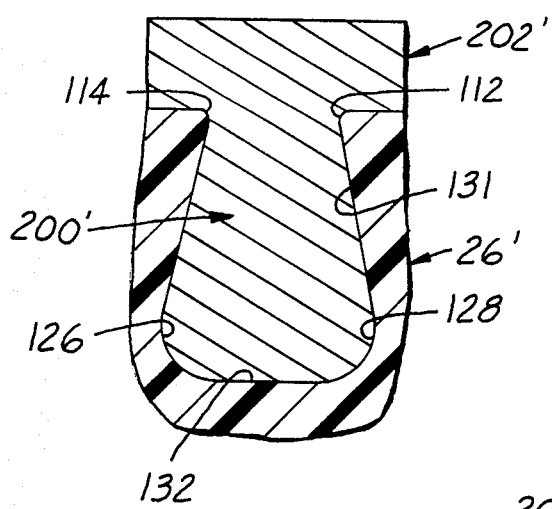
FIGS. 15 and 16 are fragmentary cross-sectional views similar to those of FIGS. 11 and 12 respectively, showing a second embodiment of a core protrusion of the mold engulfed in the urethane material of the ornamental plastic overlay as utilized in making the attachment groove pocket of the embodiment of FIGS. 7-12.
Figure 16:
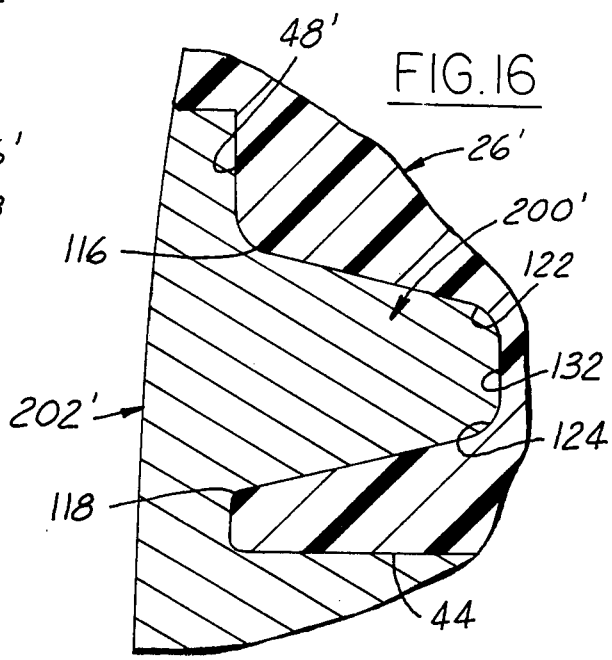

Referring in more detail to the accompanying drawings, FIGS. 1 through 6 illustrate one embodiment of a wheel construction utilizing the hub cap retention structure and method of making the same in accordance with the invention. The wheel is generally designated 20 and comprises, by way of a preferred example, a conventional drop center steel rim 22, a central steel disc or body 24, and an ornamental 3-dimensional contour overlay, generally designated at 26, secured to the outboard face of disc 24 and to the outboard surface of rim 22. Disc 24 is provided with a circle of bolt holes 28, and a central wheel spindle aperture 30 so that wheel 20 can be removably attached to a wheel hub and associated disc or drum brake assembly. For decorative purposes and for brake ventilation, a plurality of cut-outs or vent holes 32 are provided in disc 24. The particular configuration of the steel components of wheel 20, including rim 22 and disc 24, may follow solely utilitary and considerations such as strength of the wheel and ease and economy of manufacture, since the athestic appearance of the wheel is determined largely by the 3-dimensional contour of the ornamental overlay 26, which in turn is determined by the particular ornamental or asthetic appearance as desired by the designer of wheel 20.

In the ornamental design of FIGS. 1 and 2, overlay 26 is provided with a radially inner and outer annular sections 34 and 36 extending circumferentially continuously around the outboard face of the wheel and interconnected by circumferentially inclined spoke portions 38 and 40 to thereby define a circumferential row of scoop type cavities 42 which communicate with wheel vents 32. The radially innermost portion of overlay 26 is defined by a generally cylindrical surface 44 which extrends axially outwardly from the crown section 46 of disc 24 and terminates at its axially outer edge at a radially outwardly extending inset surface 48 molded into overlay section 34. Surface 48 terminates at its radially outer edge at a cylindrical surface 50, surfaces 48 and 50 thus defining an inset seating surface for receiving thereagainst the outer peripheral portion 52 of a removable hub cap 54 (FIG. 2) constructed in accordance with the present invention. Although hub cap 54 is shown only in radial cross-section in FIG. 2 in the drawings, it is to be understood that the same has a disc-like configuration and has a thickness in its outer peripheral portion 52 so as to seat snuggly in the seating groove 48-50 of overlay 26 so that the outer face 56 of cap 54 is flush with the outer face 58 of overlay 26. Of course, other hub cap configurations may also be employed without departing from the principles of the present invention.

In accordance with one feature of the present invention, hub cap 54 is provided with a plurality, preferably three or more, of retention prongs 60 (FIGS. 2, 4 and 5) which protrude axially from the inboard face 62 of cap 54 near the outer periphery of the cap, prongs 60 being circumferentially spaced at equal angular increments around cap 54. Each prong 60 has a cylindrical shank portion 66 joined at one end integrally to cap 54 which terminates at its other end in an enlarged, generally conically shaped head 68 which defines a pointed apex 70 and at its maximum diameter defines a curved ridge surface 72.

In accordance with another feature of the present invention, overlay 26 is provided with a plurality of "key way" pocket slots 80 in its outboard face corresponding in number and location to the prongs 60 of cap 54 and adapted for individual yieldable retention of the prong 60 therein, as shown in FIGS. 2 and 5. Each slot 80 has a crosssectional configuration in its free state, as shown in FIG. 5, which may be termed "bulbous" as defined by a circular bottom wall 82 having a diameter of, for example, six millimeters. Each slot 80 also has a neck portion defined by inwardly facing mutually convex surfaces 84 which extend axially outwardly of the wheel to the surface 48 to define therewith parallel spaced apart entrance edges 86 and 88 (FIG. 3). In the example given, the distance between surfaces 86 and 88 may be six millimeters, whereas the distance between surfaces 84 and 85 at their closest point may be four millimeters. The depth of slot 80 measured from surface 48 to the bottom of the slot may be 9.2 millimeters. Slot 80 also opens radially inwardly at surface 44 (FIGS. 1, 3 and 6), and extends radially outwardly from surface 14 to a circular outer end 90, this dimension, in the foregoing example, being ten millimeters.

Each prong 60 in the foregoing example has a maximum diameter at ridge 72 of 6 millimeters, shank 66 has a diameter of 4 millimeters, and the axial length of prong 60 is nine millimeters.

Alternatively, the prong may be a male duplicate of the cavity in the "POLYCAST" with clearance at the base or shank and at the peak of the apex.

Thus, this alternative would have the same cross-sectional configuration as shown in FIG. 5 of prong 60, but would be elongated radially of the cap to match the corresponding slot 80.

In accordance with the method of the invention pocket, slots 80 are formed by complementarily shaped core protrusions 200 provided on the lower mold part 202. After the urethane reaction mixture is poured or injected into the mold cavity, the same is allowed to cure almost to completion. However, the mold is separated before the urethane material has completely cooled and cured. When the urethane is in this relatively soft condition, the slot cores 200 are easily stripped from the slots 80. Moreover, since the slots are open on two sides, i.e., at surface 44 and 48 the urethane material is easily deflectable for demolding. Once the cores 200 have been separated from the slots, the urethane material will resume the as-molded curvature as shown in FIG. 5. When the urethane material has cooled and the cure is completed, the resiliences of the urethane walls defining each undercut slot 80 will provide a yieldable but firm retention characteristic for reception and releasable retention of a prong 60 therein.

As seen in the comparison of FIGS. 4 and 5, hub cap 54 is readily installed on wheel 20 by simply aligning each prong 60 with a respective slot 80 and, with cap 54 centered on the wheel axis, the same is pushed axially inboard to drive the prongs into their respective slots 80. As prong 60 enters slot 80, the prong head 68 will deflect the side walls 84 and 85 as shown in FIG. 4. Once head ridge 72 has moved past the side walls and cap 54 is in fully seated position, the undercut shape of the slot will provide secure retention of the prong therein. Since it is the resilience of the urethane material which provides the yieldable spring retention force, prong 60 itself may be made of rigid material, either metal or plastic, and preferably of the same material of which cap 54 is constructed. When it is desired to remove hub cap 54 from wheel 20, the same is merely pulled axially in an outboard direction after being pried at one edge and tipped slightly, to thereby strip the prongs from the slots.

Referring to FIGS. 7 through 12, another embodiment 20' of an improved wheel construction in accordance with the present invention is illustrated fragmentarily therein. Structural elements identical to those previously described in conjunction with wheel embodiment 20 are given like reference numerals, and reference numerals raised by a prime suffix indicate structure corresponding in function and operation to that previously described. Inasmuch as the only difference between the modified wheel 20' and wheel 20 resides in the structure of the hub cap attachment prongs and the associated retention pockets formed in overlay 36', only these elements will be described in detail.

A modified hub cap 54' is provided with a plurality of attachment prongs 60' which protrude axially inboard from the inboard face 62' of the hub cap. Prongs 60' are spaced circumferentially at equal angular increments around the inboard face of the hub cap in the same manner as prongs 60. However prongs 60' are formed from wire stock, and may be integral with and interconnected by a wire loop 100 molded or cast into cap 64' with each prong 60' comprising an outward protrusion of the loop. Loop portion 100 thus extends circumferentially around cap 54' adjacent the outer peripheral edge thereof, as indicated in FIGS. 8, 9 and 12. Each prong 60' consists of a pair of legs 102 and 104 which protrude inboard from cap face 62' and then merge into a eyelet or ring portion 106 to thereby define a bulbous prong shape having a maximum diameter at points 108 and 110 (FIGS. 9, 10 and 11). Thus the plane of the wire prong loop 102, 104, 106, 108 and 110 extends parallel to the axis of cap 54' and perpendicularly to the radius of the cap and wheel.

In accordance with another feature of the modified wheel embodiment 20', yieldable retention pockets 80' are provided in overlay 26' at circumferentially spaced points around inset face 48' so as to correspond in number and location to prongs 60'. Each pocket 80' is in the form of an undercut oblong blind hole. The entrance to the hole in surface 48' has the oblong shape shown in FIG. 9 as defined by parallel side edges 112 and 114 and juxtaposed semicircular end edges 116 and 118. The maajr axis of the opening 112-118 of pocket 80' is shown as dot dash line 120 in FIG. 9 and extends radially of the wheel 20'. Then, moving from this opening axially in an inboard direction into pocket 80' to the bottom thereof, this oblong shape changes direction 90°. Thus, at the bottom of the hole there is another oblong configuration defined by parallel side edges 122 and 124 which extend circumferentially of the wheel and merge into juxtaposed semi-circular end edges 126 and 128. The pocket bottom oblong cross-sectional configuration has a major axis indicated by the dot dash line 130 in FIG. 9, which is perpendicular to axis 120. It is to be noted that the geometry of the interior side wall surface 131 of pocket 80' is such that sections cut through pocket 80' in radial planes perpendicular to the wheel axis at any level in the depth of the hole will have a constant perimeter dimension.

In one preferred example of the wheel embodiment 20', the depth of pocket 80' measured from surface 48' to the bottom surface 132 of the pocket may be nine millimeters. The distance between the parallel side edges 112 and 114, and likewise between the parallel side edges 122 and 124, is four millimeters, and the distance between the end edges 116 and 118, and 126 and 128, taken along the respective axes 120 and 130, is eight millimeters. Likewise, with respect to the associated prong 60' the distance between face 62' and the appex of 106 is 8 millimeters, the maximum outside diameter at the points 108 and 110 is 6 millimeters, and the diameter of the wire stock 100 is 1 millimeters.

Modified cap 54' is removably attached to wheel 20' in the same manner as cap 54; that is, by aligning prongs 60' with their associated pockets 80' and pushing cap 54' axially endwise inboard until it abuts surface 48'. During this insertion procedure, prong 60' will spread apart the pocket surface edges 112 and 114 and wall 131 as indicated in the view of FIG. 10, the resilient urethane material of overlay 26' yielding as prong 60' enters the pocket. Once prong 60' is fully inserted into the pocket to the position shown in FIGS. 8, 9 and 11, 12, the side walls of the pockets immediately beneath or inboard of entrance edges 112 and 114 will serve as a spring keeper with respect to the prong 60'.

It is to be noted that, in accordance with a principal feature of the hub cap attachment structure of wheel embodiment 20', the insertion and removal of prongs 60' into their respective pockets 80' will distort the shape of the pocket as the same resiliently yields to permit passage of prong 60'. However, due to the constant pocket perimeter dimension as described previously, the wall surface of the pocket is distorted with minimal stretch during such deflection of the urethane material.

In the formation of pockets 80' during molding of the overlay 26' onto wheel 20' the lower mold part 202' is again provided with core protrusions 200' having a shape complementary to the aforementioned geometry of pocket 80'. Again, in accordance with the method of the invention, demolding is done before the urethane material has completely cooled and cured. Due to the unique constant perimeter geometry of pocket 80', as the wheel is demolded, i.e., when wheel 20' with overlay 26' cast and adhered thereto is lifted from the lower mold part 202', the shape of pocket 80' is again distorted, by retraction of the core protrusion; but the interior wall surface of the pocket is not required to stretch. This enables a relatively large undercut angle design for pocket 80' while at the same time simplifying the mold structure, and also insures relatively easy withdrawal of the mold core members during demolding without damage to the urethane material. In the finished wheel 20', this feature also increases reliability of retention and wear life of the retaining pockets 80' despite repeated attachment and removals of hub cap 54'.

It will thus seen that prong 60' and pockets 80' of wheel embodiment 20', as well as prong 60 and pockets 80 in wheel embodiment 20, provide snap-in wheel retention of hub caps 54' and 54 indirectly to the elastomeric material of overlays 26 and 26' rather than directly to the metallic disc 24 of the wheel. These retention systems, by providing the unique retention groove or pocket geometry described herein, in conjunction with demolding prior to complete cure of the urethane, permits large die-lock angles to be provided in the retention groove or pocket, resulting in a secure retention of each prong and its associated groove or pocket. The pockets or grooves may be provided in a portion of the overlay 26 or 26' having a dimension axially of the wheel of a relatively minimal or shallow nature. The hub-cap-to-wheel retention properties are unaffected by the normal variations found in the shrinkage of the urethane material since this will cause only minor localized shrinkage around each groove or pocket rather than the major dimensional changes which occur across the diameter of the cap recess where prior center-cavity cap retention structure has been located. Moreover, each prong and associated groove or pocket is independent of the other prongs and pockets, further enhancing the reliability of the attachment system. In both of the illustrated embodiments of the invention, the attachment prongs 60 and 60' may be made of non-resilient material inasmuch as the spring retention forces are developed entirely in the resilient urethane material of overlays 26 and 26'. Hence, hub caps 54 and 54' may be made of rigid plastic material by injection molding or otherwise, or may be made as sheet metal stampings or as die castings if desired. It is also to be understood that prongs 60' need not be made as wire loops as illustrated in the embodiment of wheel 20' but rather may be molded to have the exterior configuration of prongs 60' and may be formed integrally with hub cap 54'.

It is also to be understood that, although the foregoing description and drawings describe and illustrate in detail various successful working embodiments of the present invention, to those skilled in the art to which the present invention relates, the present disclosure will suggest many modifications in construction as well as widely differing embodiments and applications without thereby departing from the spirit and scope of the invention. The present invention, therefore, is intended to be limited only by the scope of the appended claims and the applicable prior art.

I claim:

1. In a composite styled wheel having a metallic portion comprising a wheel mounting disc and a rim secured to said disc and adapted to receive a tire thereon, and a plastic portion comprising an ornamental overlay body disposed adjacent and covering at least a part of the outboard face of said metallic portion, said body being permanently affixed to said metallic portion and comprising a homogeneous one-piece body made of a resilient urethane elastomeric material, the outboard face of said body being exposed to view from the outboard side of said wheel and having a decorative surface spaced axially of the wheel outboard from the covered part of the outboard face of said metallic portion, said outboard face of said body having a contour differing from the contour of the covered part of the outboard face of said metallic portion and adapted to provide decorative contour over at least part of the metallic portion of said wheel, the improvement in combination therewith of hub cap retainer means provided in said body opening at an exterior hub cap seating surface provided on the outboard face thereof, said retainer means being adapted to yieldably engage and retain attachment prongs of a hub cap adapted for removable attachment to the outboard face of said body on said seating surface, said hub cap retainer means comprising a plurality of circumferentially spaced blind cavity pocket means mold formed in and made of said resilient urethane elastomeric material of said body and each having an opening at said outboard exterior seating surface of said body adapted for registration individually with an associated one of the hub cap prongs, each said cavity pocket means having juxtaposed entrance edges at said exterior surface defining said opening and spaced apart a distance less than a maximum transverse dimension of said prongs to provide an interference fit therewith, each said cavity pocket means having interior wall surfaces defining an undercut relationship relative to said cavity pocket opening edges, said cavity pocket entrance edges and the contiguous wall surfaces of each said cavity being formed of said resilient elastomeric material of said ornamental overlay body and thus being yieldable so as to spread apart to permit insertion of said prongs and then return to a spring keeper relationship once the associated prong reaches a seated position in the associated said cavity pocket matching the fully seated position of the hub cap on said body.

2. The wheel as set forth in claim 1 wherein each said cavity means comprises a slot having a major dimension extending radially of said body and having a second opening communicating with a radially inwardly facing surface of said body extending circumferentially around the inner periphery of said body, said slot having opposed side walls defining the undercut geometry thereof with said side walls converging with said parallel entrance edges of said slot at the exterior of said seating surface of said body, said entrance edges extending radially of said body.

3. A wheel and hub cap combination comprising the wheel as set forth in claim 2 and a hub cap having a plurality of prong means extending axially from inboard face thereof adapted for individual registry with each of said slot cavity means, said prongs comprising a shank secured to the inboard side of said hub cap said shank terminating at its free end in an enlarged head portion having a pointed end, the maximum dimension of said head portion being larger than the spacing between said side edges of said cavity slot means and equal to or less than the maximum interior free state spacing between the juxtaposed side walls of said cavity slot means, said prong means having an axially length equal to or slightly less than the depth of said cavity slot means.

4. The combination set forth in claim 3 wherein said hub cap and prongs thereof are made of the same material and integrally secured together.

5. The wheel as set forth in claim 1 wherein each said cavity means comprises a blind pocket having an entrance edge at said exterior seating surface of said body defining an oblong shape, said pocket having a cross-sectional configuration adjacent a bottom blind wall thereof also of generally oblong configuration with a major axis disposed transversely to the major axis of the oblong configuration of said entrance edge, the depth dimension of said pocket extending axially of the wheel, said pocket having interior wall surfaces having a constant perimeter dimension in any plane section taken in a plane radially of the wheel and perpendicular to the depth dimension.

6. A wheel and hub cap combination comprising the wheel as set forth in claim 5 and a hub cap having a plurality of prongs adapted for individual registry with each of said pockets, said hub cap prongs having a generally bulbous shape with a maximum transverse dimension greater than to the spacing between the pocket entrance edges taken perpendicuarly to the major axis of said entrance opening of said pocket.

7. The combination set forth in claim 6 wherein said hub cap includes a wire member embedded in said hub cap and having portions protruding therefrom each defining an eyelet loop and thereby forming said prongs.

8. A method of making a composite styled wheel of the type having a metallic portion comprising a wheel mounting disc and a rim secured to said disc and adapted to receive a tire thereon and a plastic portion comprising an ornamental overlay body disposed adjacent and covering at least a part of the outboard face of said metallic portion, said body being permanently affixed to said metallic portion and being made of a elastomeric material, the outboard face of said body being exposed to view from the outboard side of said wheel and having a decorative surface spaced axially of the wheel outboard from the covered part of the outboard face of said metallic portion, said outboard face of said body having a contour differing from the contour of the covered part of the outboard face of said metallic portion and adapted to provide decorative contour over at least part of the metallic portion of said wheel, and having hub cap retainer means provided in said body on the outboard face thereof adapted to yieldably engage and retain attachment prongs of a hub cap adapted for removable attachment to the outboard face of said body, said hub cap retainer meanscomprising a plurality of circumferentially spaced blind cavity means each having an opening at an outboard exterior surface of said body adapted for registration individually with an associated one of the hub cap prongs, said cavity means having juxtaposed entrance edges at said exterior face defining said opening and spaced apart a distance less than a maximum transverse dimension of said prongs to provide an interference fit therewith, said cavity means having interior wall surfaces defining an undercut realtionship relative to said cavity opening edges, said cavity entrance edges and the cotiguous wall surfaces of said cavity being yieldable so as to spread apart to permit insertion of said prongs and then return to a spring keeper relationship once the associatd prong reaches a seated position in said cavity matching the fully seated position of the hub cap on said body, said method comprising the steps of:

(1) molding said decorative body against said wheel outboard face from a urethane reaction mixture injected into a mold including the wheel outboard face and core protrusions adapted to serve as cores to define said blind cavity means, and (2) just prior to the complete cooling and curing of said urethane mixture and while the same is soft, removing the wheel with the body adhered thereto from the mold while concurrently stripping the core protrusion from the body.

* * * * *